United States Patent

Skjak-Braek et al.

[11] Patent Number: 4,990,601
[45] Date of Patent: Feb. 5, 1991

[54] MODIFICATION OF ALGINATES OR OTHER URONIC ACID COMPOUNDS BY TREATMENT WITH $CO_2$

[75] Inventors: Gudmund Skjak-Braek, Trondheim; Trygve Eklund, Nesbru; Kurt O. Von Husby, Drammen; Bjarne J. Kvam, Haugesund; Olav Smidsrod, Trondheim, all of Norway

[73] Assignee: Protan S/A, Drammen, Norway

[21] Appl. No.: 206,345

[22] PCT Filed: Oct. 6, 1987

[86] PCT No.: PCT/NO87/00065
§ 371 Date: Aug. 16, 1988
§ 102(e) Date: Aug. 16, 1988

[87] PCT Pub. No.: WO88/02758
PCT Pub. Date: Apr. 21, 1988

[30] Foreign Application Priority Data
Oct. 17, 1986 [NO] Norway .................................. 864147

[51] Int. Cl.[5] .............................................. C08B 37/04
[52] U.S. Cl. ....................................................... 536/3
[58] Field of Search .............................................. 536/3

[56] References Cited

U.S. PATENT DOCUMENTS
341,072  1/1881  Stanford .................................. 536/3

FOREIGN PATENT DOCUMENTS
1042438  9/1966  United Kingdom ...................... 536/3

OTHER PUBLICATIONS

Grasdalen, H., "High-Field, [1]H-n.m.r. Spectroscopy of Alginate: Sequential Structure and Linkage Conformations", Carbohydrate Reasearch, 118: 255–26 (The Netherlands 1983).

Skjåk-Braek, G. et al., "Tailoring of Alginates by Enzymatic Modification in Vitro", Int J. Biol Macromal, 8:330–336 (U.S.A. 1986).

Primary Examiner—Merrell C. Cashion, Jr.
Assistant Examiner—Carlos Azpuru
Attorney, Agent, or Firm—Fleit, Jacobson, Cohn, Price, Holman & Stern

[57] ABSTRACT

A method for modification of alginates or other uronic acid containing compounds to give improved physical properties, wherein the alginates in solid form are treated with $CO_2$ under supercritical conditions thereby achieving at least partial epimerization of said uronic acid containing compound. The critical point of $CO_2$ is pcrit=73.83 bar and tcrit=31° C.

9 Claims, 2 Drawing Sheets

MODIFICATION OF ALGINATES OR OTHER URONIC ACID COMPOUNDS BY TREATMENT WITH CO$_2$

BACKGROUND OF THE INVENTION

1. Field of the Invention

The present invention relates to a method for modification of alginates and other uronic acid substances to obtain changes in the functional properties, in particular with respect to the ability of forming gels with inorganic or organic polyvalentions.

2. Prior Art

Alginates are manufactured from brown sea-weed and are utilized in several applications where their polyelectrolytic nature forms the basis for e.g. gelation, thickening as well as water- and ion-binding.

Chemically speaking, alginates constitute a group of linear, binary copolymers built up of salts of β-D-mannuronic acid (M) and its C-5 epimer, α-L-guluronic acid (G). The M and G units are found in three types of sequences; G-rich sequences called G-blocks, M-rich sequences called M-blocks, and alternating sequences found in MG-blocks, symbolized MGMG. The fractional content of these monomer units as well as their sequencial distribution varies with the algal source. The ion binding and gelforming properties depend on the monomer fractions, but in particular on the distribution of G-units along the chain. A high content of G-blocks leads to the technically important gel-forming properties.

SUMMARY OF THE INVENTION

The object of the present invention is to convert M-units to G-units in oligomers or polymers, in order to change their physical properties. This type of endo-epimerisation of the intact polymer may be performed by treating alginate with mannuronan C-5 epimerase, an enzyme participating in the in vivo biosynthesis of alginate (cf. NO application 845059).

DETAILED DESCRIPTION OF THE INVENTION

Figure 1:
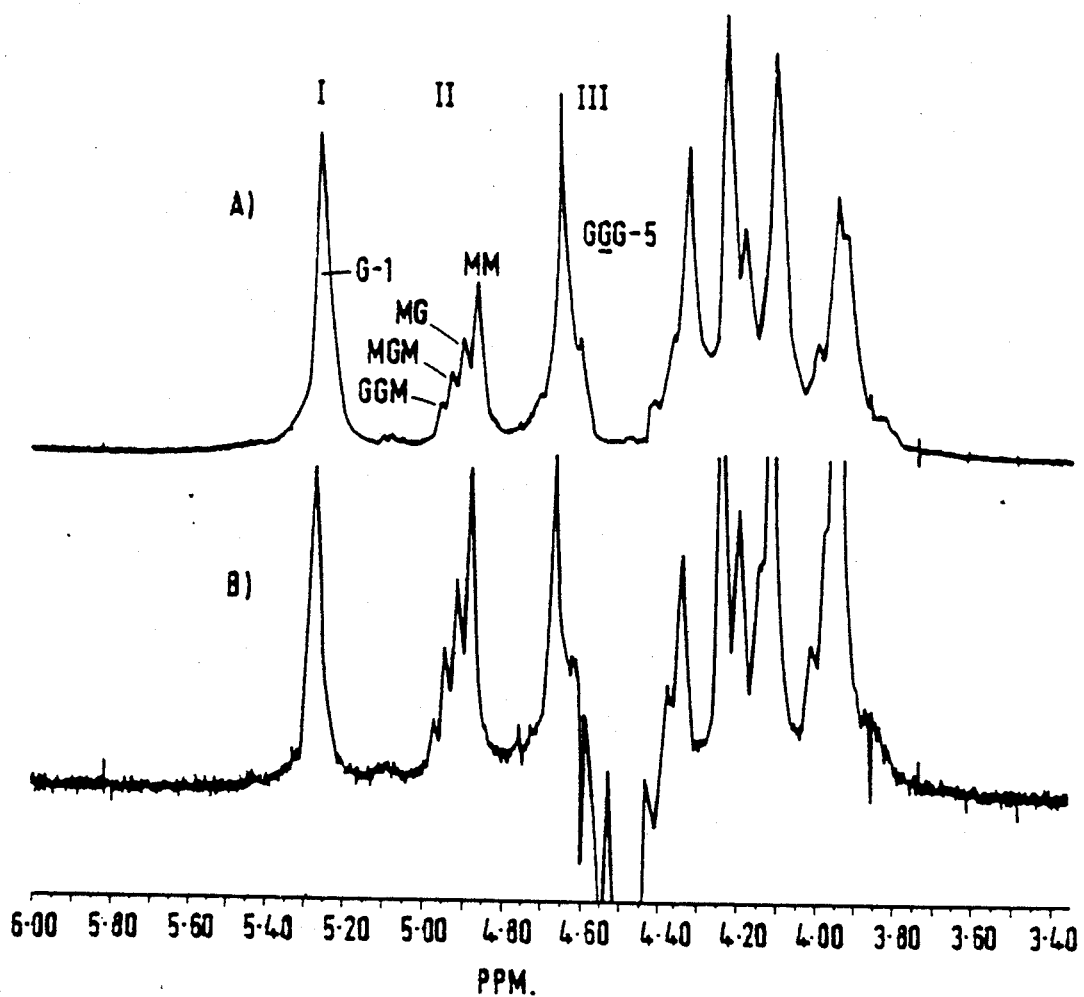
FIG. 1 generally shows a 400 MHz $^1$H n.m.r. spectra of Na-alginate from *L. hyperborea* fronds. Specifically, (A) shows Na-alginate from *L. hyperborea* fronds, treated with CO$_2$ under supericritical conditions for 12 hours at 500 bar and 45° C. and (B) shows untreated alginate. The change in G content of the modified polymer is demostrated by the relative intensity increase in "G signals" (I and III) compared to "M signals" (II).

According to the present invention such epimerisation, well known as an enzymatic process from several polysaccharide producing organisms, may also be performed without enzymes. This kind of process has previously not been possible on a polymer level, as an alkali catalyzed abstraction of H-5, resulting in a carbanion (charge at C-5), will lead to hydrolysis ot the polymer chain in the presence of water. Furthermore, most polyuronides (.e.g. alginate) are insoluble in non-polar solvents, reactions in aprotic solvents will therefore be difficult to perform.

The present invention is based on a completely new principle that eliminates the problem mentioned above by treating alginate in the solid state with carbon dioxide under supercritical conditions, where the density is like in a liquid, but the diffusion rate is as in the gas state. CO$_2$ may then act both as an aprotic solvent and as a catalyst in the alkaline removal of H-5, resulting in a C-5 carbanion. The high pressure will contribute energetically to the epimerisation, as the diaxially linked G-units give a more compact chain structure, and hence, a lower partial molar volume as compared to the diequatorially linked M-units. Furthermore, in aprotic solvents the anomeric effect renders axial substitution in C-1 more favorable, as in α-L-guluronate in alginate.

Carbon Dioxide has a critical point, defined by a specific pressure of CO$_2$Pcrit=73.83 bar and a temperature of CO2 tcrit =31° C.

As starting material alginate from algal or bacterial sources may be chosen, either as salts (alkali or alkaline earth metal forms), esters or other acid derivatives.

Applications of supercritical carbon dioxide are hitherto found mainly within extraction of e.g. aroma compounds, using the supercritical fluid as an inert solvent (see H. Coenen and E. Kriegel, "Uses of Supercritical Gas Extraction in the Food Industry", *J. Chem. Ing. Tech.* 55 (1983) 890). The invention forming the basis for the present invention is the first known example of a non-enzymatic, chemical epimerization of polysaccharides, and the first application of a supercritical fluid as both catalyst and solvent in a chemical reaction. The present invention also differs from enzymatic and most other known chemical modification processes of this kind in being applicable to a solid state material. The known processes mentioned require dilute solutions (<1%), and the product must be precipitated, purified and dried in a costly process.

We have treated alginate with CO$_2$ under supercritical conditions using varying pressures (150-500 bar), and the experimental conditions were reflected in a varying, but significant epimerisation, a corresponding increase in gel strength also accompanied the epimerisation. Thus, the result suggests that C-5 epimerisation of glycuronans or corresponding oligosaccharides by supercritical carbon dioxide treatment provides a completely new method for chemical modification of carbohydrates.

The chemical process being the object of the present invention has a great economic potential due to the following:

(A) It may be performed on solid state material.
(B) No toxic or hazardous chemicals are needed, and hence, no purification of the product is required.
(C) The process may conveniently be performed on a large scale as technology for extraction with supercritical fluids is already developed for other purposes.
(D) The process is not limited to epimerisation of β-D-mannuronate residues in alginate, but may as well be utilized for epimerisation of other polyuronides as e.g. C-6 oxidized cellulose, where D-glucuronic acid is converted to its C-5 epimer L-iduronic acid. Corresponding reactions may be utilized in treatment of mucopolysaccharides, e.g. chondroitin sulfate and hyaluronic acid:

EXAMPLE 1

Sodium alginate (50 g) isolated from *Laminaria hyperborea* was packed in a steel column and treated with $CO_2$ under supercritical conditions. The pressure was varied between 150 and 500 bar. The gas flow was 0.5–10 ml/min, the temperature 45° C. and the treatment lasted for 12 hours. Loss of material was <1% in all experiments. The polymer composition was determined by high-field (400 MHz) $^1$H NMR spectroscopy (cf. FIG. 1) (H. Grasdalen "High-field $^1$H-NMR Spectroscopy of Alginate: Sequential Structure and Linkage Conformation." *Carbohydr. Res.* 118 (1983) 255–260) and is expressed in Table I as the molar fractions of the two monomer units, M and G, as $F_M$ and $F_G$, repectively, where $F_M+F_G=1$, and as the sequence parameters or fractions of the four "Nearest neighbour" sequences, MM, GG, MG, and GM, where $F_{MM}+F_{GG}+2F_{MG}=1$.

The results in table I show that $CO_2$ treatment has resulted in a significant increase in the guluronate content by three different pressure conditions. The content, as expressed by $F_G$, changed from 0.52 (i.e. 52%) in the untreated material to 0.60, 0.64 and 0.66 after the treatment. The highest pressure (500 bar) gave the greatest change in composition.

This increase in G content resulted in alginates with an increased ability to form gels with polyvalent ions. Table II shows some physical properties of the $CO_2$ treated polymers. Viscosities were determined in a Brookfield viscometer and intrinsic viscosities [η] were determined in a Cannon-Ubbelohde capillary viscosimeter. Gel strengths of 1% calcium alginate gels were determined in a FIRA gel strength apparatus, and the modulus of rigidity in 2% homogenous calcium gels were determined in a Stevens Texture Analyser (G. Skjåk-Bræk, B. Larsen and O. Smidsrød "Tailoring of Alginate By Enzymatic Modification in vitro." Int. J. Biol. Macromol. 8 (1986) 330–336).

The $CO_2$ treatment resulted in a decrease in the intrinsic viscosity, supposedly caused by hydrolytic cleavage of glycosidic bonds. However, the limited degradation has no influence on the gel forming properties of alginates. The gel strength, in terms of both the FIRA values and the modulus of rigidity, showed a pronounced increase and let to values comparable to those found for the most strongly gel-forming alginates obtained from the stipe of *Laminaria hyperborea*.

TABLE I

MONOMER COMPOSITION AND SEQUENCE PARAMETERS FOR $CO_2$-TREATED ALGINATE.

|  | $F_G$ | $F_M$ | $F_{GG}$ | $F_{GM}$ | $F_{MM}$ |
|---|---|---|---|---|---|
| Untreated sample | 0.52 | 0.48 | 0.34 | 0.18 | 0.30 |
| 150 bar | 0.60 | 0.40 | 0.50 | 0.10 | 0.30 |
| 250 bar | 0.64 | 0.36 | 0.55 | 0.09 | 0.27 |
| 500 bar | 0.66 | 0.34 | 0.53 | 0.13 | 0.21 |

TABLE II

PHYSICAL PROPERTIES OF $CO_2$-TREATED ALGINATE

|  | Viscosity in water (1%) (mPa·s) | Intrinsic viscosity [η] (dl/g) | Gel strength FIRA (ml) 1% calcium gel | Modulus of rigidity (N/cm$^2$) 2% calcium gel |
|---|---|---|---|---|
| Untreated sample | 205 | 8.8 | 40 | 6.2 |
| 150 bar | 80.6 | 6.9 | 63 | — |
| 250 bar | 86.2 | 6.8 | 63.5 | — |
| 500 bar | 80.7 | 6.9 | 63.5 | 9.0 |

EXAMPLE 2

Figure 2:
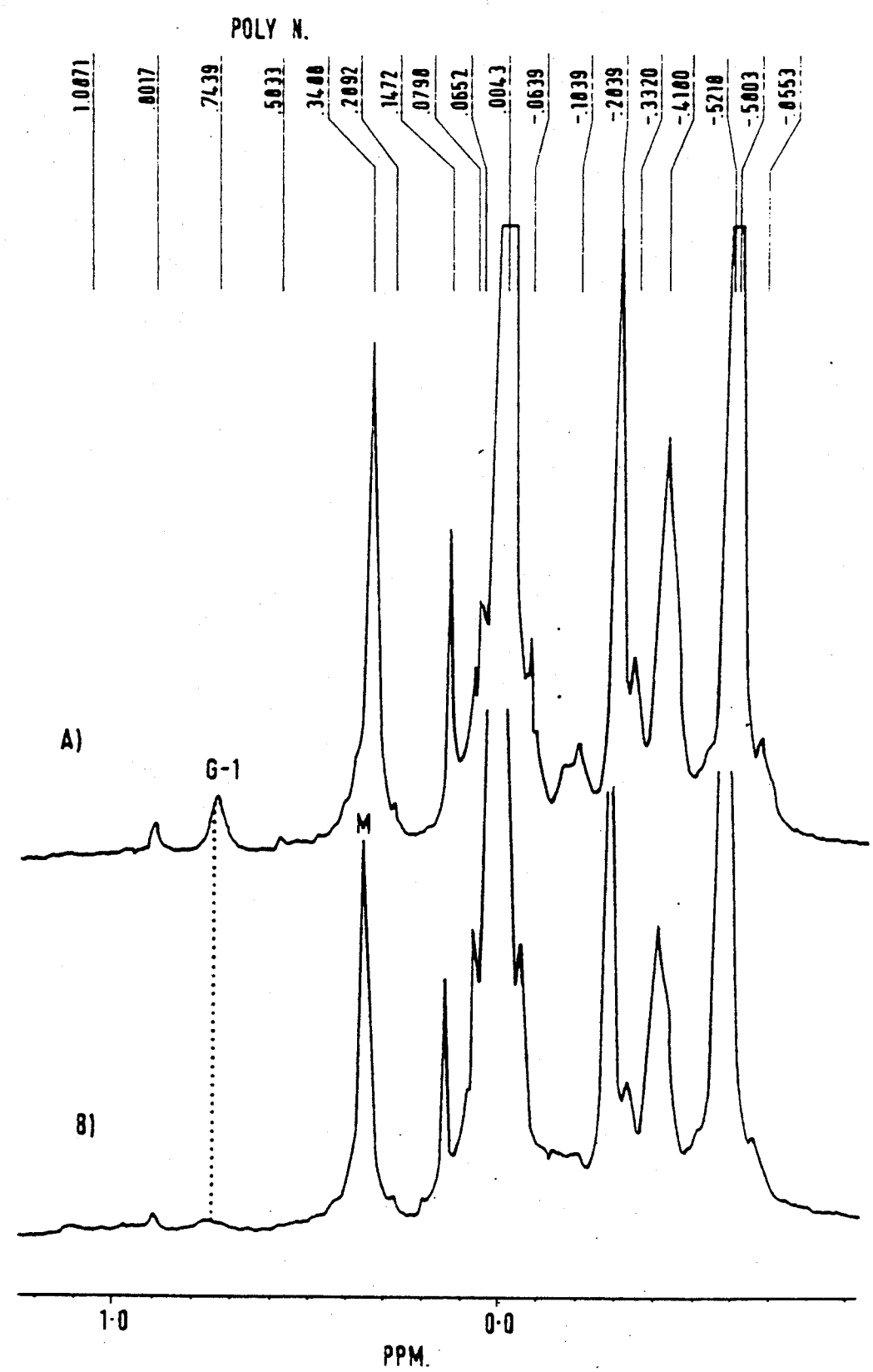
FIG. 2 generally shows a 400 MHz $^1$H n.m.r. spectra of sodium polymannuronated isolated from *A. nodosum*. Specifically, (A) shows Na-ploy-M from *A. nodosum*, treated with CO$_2$ under superoritical conditions for 12 hours at 200 bar ($F_G=0.16$) and (B) shows untreated poly-M ($F_G<0.05$). Signal I in the spectrum corresponds to the L-guluronate content.

The sodium salt of poly-mannuronic acid isolated from *Ascophyllum nodosum* was treated for 12 hours with supercritical $CO_2$ at 200 bar and 45° C. The loss was <0.5%. The guluronate content in the polymer increased from <5% to 16% (cf. FIG. 2). The result clearly suggests that D-mannuronate of the intact polymer is C-5 epimerised under the give conditions.

We claim:

1. A method for producing at least partial epimerization of a uronic acid containing compound, comprising the steps of:
   providing a uronic acid containing compound in solid form; and
   treating said uronic acid containing compound with $CO_2$ under supercritical conditions thereby achieving at least partial epimerization of said uronic acid containing compound, wherein the critical point of $CO_2$ is pcrit=73.83 bar and tcrit=31° C.

2. A method according to claim 1, wherein the uronic acid containing compound is an alginate.

3. A method according to claim 1, wherein the uronic acid containing compound is a member selected from the group consisting of salts, acids and esters of a uronic acid.

4. A method according to claim 1, wherein the uronic acid containing compound is an alginic acid derivative.

5. A method according to claim 1, wherein said uronic acid containing compound is treated with $CO_2$ in a batch-wise manner.

6. A method according to claim 1, wherein said uronic acid containing compound is treated with $CO_2$ by continuous flushing.

7. A method according to claim 1, wherein the uronic acid containing compound is selected from the group consisting of monouronides, oligouronides, polyuronides and other uronate containing polymers.

8. A method according to claim 1, wherein the uronic acid containing compound is heparin.

9. A method according to claim 1, wherein the uronic acid containing compound is chondroitin sulfate.

* * * * *